United States Patent [19]

Dischert et al.

[11] 3,830,959

[45] Aug. 20, 1974

[54] AUTOMATIC CENTERING CONTROL SYSTEM FOR TELEVISION APPARATUS

[75] Inventors: Robert Adams Dischert; John Francis Monahan, both of Burlington, N.J.

[73] Assignee: RCA Corporation, New York, N.Y.

[22] Filed: Mar. 23, 1973

[21] Appl. No.: 344,066

[52] U.S. Cl. .............................................. 178/5.4 M
[51] Int. Cl. .............................................. H04n 9/08
[58] Field of Search ....................... 178/5.4 R, 5.4 M

[56] References Cited

FOREIGN PATENTS OR APPLICATIONS 1,266,336 3/1972 Great Britain .................. 178/5.4 M

*Primary Examiner*—Richard Murray
*Attorney, Agent, or Firm*—Eugene M. Whitacre; Charles I. Brodsky

[57] ABSTRACT

The described control system provides automatic registration of colors for television reproduction by comparing individual horizontal and vertical color components of an object scene, and by developing output control voltages whenever mis-registration occurs. The horizontal and vertical components of one such color are periodically compared against themselves at different points in the system to provide a further control signal indicative of differences in the translation characteristics of the comparison channels utilized.

10 Claims, 4 Drawing Figures

AUTOMATIC CENTERING CONTROL SYSTEM FOR TELEVISION APPARATUS

FIELD OF THE INVENTION

This invention relates to color television systems, in general, and to apparatus for automatically controlling direct current potentials utilized in centering the scanning beam of a color television pickup tube, in particular.

SUMMARY OF THE INVENTION

As will become clear hereinafter, the apparatus of the invention operates to automatically compare horizontal and vertical color components of an object scene to determine whether any degree of mis-registry exists. A control signal is developed in response thereto, and is applied to the deflection circuitry of the television camera to cause its electron beam to precisely scan the object image. These comparisons are made sequentially — comparing, for example, the horizontal component of a red color signal with the horizontal component of a reference green color signal, then the horizontal component of a blue color signal with the green horizontal component, and thereafter further comparing the vertical component of the red, and then of the blue, color signal with the vertical component of the green color signal. The results of the comparisons are thereafter processed to provide direct current potentials to adjust the centering in accordance with differences in energy balances caused by signal mis-registry.

As will be appreciated, differences in tolerance variation between the red and blue color translation circuit and the reference green color translation circuit may produce a direct current "error" potential, when in fact no mis-registration is present. The deflection circuitry, however, is generally unable to discriminate between those errors produced by tolerance variations and those produced by actual beam mis-registrations. To overcome this problem, a further mode of system operation is provided, in which the horizontal and vertical components of the reference green color signal are respectively compared with themselves in different portions of the apparatus to produce correctional voltages representative of false readings caused by tolerance variations, circuit instabilities, component aging, and the like. As will be understood, these "compensating" voltages can be used to offset any direct current error potentials produced by component vagaries. An additional sequential mode of self-calibration is therefore included wherein the horizontal and vertical components of the reference green color signal are periodically compared, in one embodiment of the invention, prior to the making of any comparisons with the red and blue color signal components.

BRIEF DESCRIPTION OF THE DRAWINGS

These and other features of the present invention will be more clearly understood from a consideration of the following description taken in connection with the accompanying drawings, in which.

DETAILED DESCRIPTION OF THE DRAWINGS

Figure 1A:
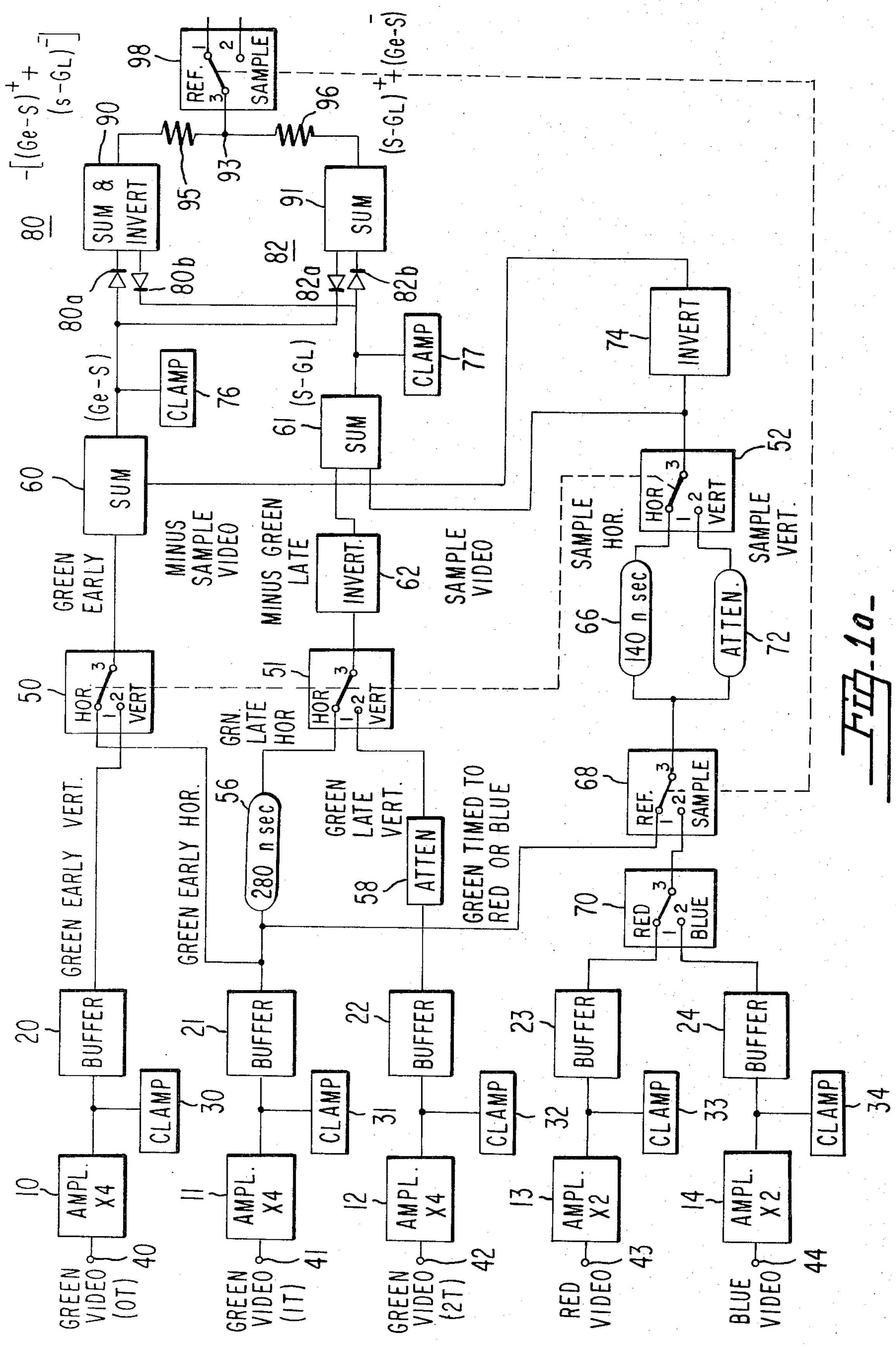
FIGS. 1*a* and 1*b* show block diagrams of automatic centering control apparatus constructed in accordance with the invention.

In considering the automatic calibration technique illustrated in the drawings, it will be appreciated that a green video signal is utilized, and delayed to produce two components, an "early" green video signal and a "late" green video signal. These components are mixed with red or blue video signal components to produce "sum" and "difference" signals for both the horizontal and vertical components. When combined to provide further signals for processing, it will be seen that all the individual color informations will be lost but only the transitional informations will remain. With the resulting horizontal or vertical color components then being subtracted one from another, the signal waveform produced will be essentially area-unbalanced when mis-registry exists, but will be area-balanced when registration is correct. The signal waveform can then be integrated to provide a direct current potential for modifying the centering control voltages within the beam deflection system.

Thus, referring to FIG. 1, it will be seen that the system includes three "multiply-by-four" amplifiers 10, 11 and 12, and a pair of "multiply-by-two" amplifiers 13, 14. The output terminal of each of the amplifiers 10-14 is coupled to an input of an appropriate buffer stage 20–24, with the signals being clamped by the circuits 30–34. In one embodiment of the invention, amplifier 10 is coupled to receive a green signal component from a point in the television camera chain at an input terminal 40, whereas amplifiers 11 and 12 receive at input terminals 41, 42 green signal components delayed with respect thereto by one and two horizontal interval time periods 1T and 2T, respectively. Amplifiers 13 and 14 couple through input terminals 43 and 44 to receive red signal and blue signal components directly from the video signal processing stages, without any delay line interposed, but at approximately twice the signal level—thus the need for different input amplifier constructions.

Three "horizontal/vertical" single pole-double throw switches 50–52 are also shown. As indicated, terminal 1 of switch 50 is directly coupled to the output terminal of buffer stage 21 while terminal 2 of switch 50 is directly coupled to the output of buffer 20. Terminal 1 of switch 51 is correspondingly coupled to the output of buffer 21, but via a delay network 56 which may provide a delay of 280 nanoseconds. Terminal 2 of switch 51 couples to the output of buffer stage 22, this time by means of an attenuator network 58 which matches the signal loss in coupling through the line 56. Output terminal 3 of switch 50 is coupled to one input of a summing circuit 60, while output terminal 3 of switch 51 is coupled to an input of a similar summing circuit 61, by means of an inverter 62.

As with switch 51, terminal 1 of switch 52 is coupled to the output terminal of buffer stage 21 via a delay network—in this instance, a circuit 66 which presents a lesser delay, e.g., 140 nanoseconds—and a further "reference/sample" single pole-double throw switch 68. In particular, with switch 68 arranged to connect its terminals 1 and 3, the output of buffer stage 21 will be seen to couple through the delay network 66 to terminal 1 of the switch 52. With terminals 2 and 3 of the switch 68 interconnected, on the other hand, terminal 1 of switch 52 is coupled via network 66 to the output terminal 3 of a "red/blue" single pole-double throw switch 70. As indicated, terminal 1 of this last switch 70 is directly connected to the output terminal of buffer stage 23, whereas terminal 2 of switch 70 is directly coupled to the output of buffer 24. A second attenuating network 72 is coupled between terminal 3 of the reference/sample switch 68 and terminal 2 of switch 52, being arranged to apply the signal from switch 68 to terminal 2 of switch 52 at the same amplitude as when coupled to its terminal 1 through the network 66. Lastly, it will be seen that output terminal 3 of switch 52 is coupled, first, directly to a second input of the summing circuit 61 and, secondly, via an inverter 74 to the second input of summing circuit 60. Clamp circuits 76 and 77 respectively couple to the output terminals of the circuits 60, 61.

To check the registration between the horizontal component of a reference green color signal and the horizontal component of the red color signal, the switches 50, 51, 52 and 70 will be arranged to connect their terminals 1 and 3 while terminals 2 and 3 of switch 68 will be connected. Thus, the 1T delayed green color signal applied at terminal 41 is coupled via switch 50 to one input of the summing circuit 60, and may be designated as a "green early" ($G_e$) signal. The signal applied at terminal 41 is delayed by network 56 in its coupling via switch 52 to one input of summing circuit 61, and may be designated as a "green late" ($G_1$) signal, of opposite polarity due to the operation of inverter 62. The red color signal applied at input terminal 43 is coupled via switches 52, 68 and 70 and network 66 to appear at the second input of summing circuit 61 as a "sample video" (S) signal of lesser delay than the green late ($G_1$) signal and to the second input of summing circuit 60 of a polarity opposite to the green early ($G_e$) signal by virtue of inverter 74. Although not shown as such, it will be understood that logic circuitry is employed to sequentially switch between the "red", "blue", "horizontal" and "vertical" positions of the units 50–52 and 70 and that the switches 50–52 incorporate filter-type networks to couple through the horizontal components of an applied signal at one instant of time and the vertical components at another instant.

Figure 2:
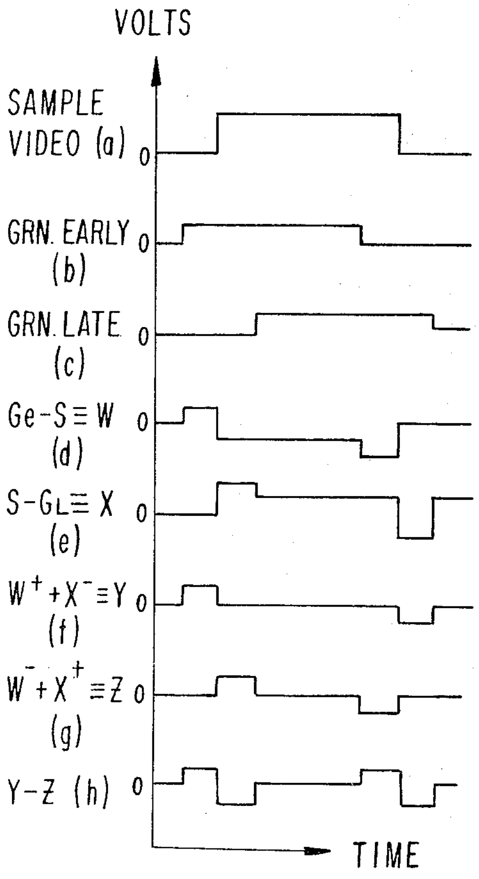
FIGS. 2 and 3 show signal waveforms helpful in an understanding of the apparatus of FIG. 1.

The sample-video (S), green-early ($G_e$), and green-late ($G_1$) signals are illustrated by the waveforms *a*, *b* and *c*, respectively, in FIG. 2 for the case of correctly registered red and green horizontal signal components. The output of summing circuit 60 ($G_e - S$) is illustrated by waveform *d* of FIG. 2, while the output of summing circuit 62 ($S - G_1$) is shown by waveform *e* of that same figure. For the case of correct registration of the red and green vertical signal components, the waveforms will appear the same as in FIG. 2. The green-early ($G_e$) signal will be provided from input terminal 40, however, while the green-late ($G_1$) signal will be provided from input terminal 42.

A pair of detector circuits 80, 82, a pair of integrators 84, 86, and a pair of amplifiers 88, 89 are also shown in FIG. 1. In particular, each of the detectors 80, 82 incorporate a pair of oppositely poled rectifiers, identified by the reference notations *a* and *b*. Whereas the anode electrode of rectifier 80*a* and the cathode electrode of rectifier 82*a* are coupled to the output of the summing circuit 60, the anode electrode of rectifier 82*b* and the cathode electrode of rectifier 80*b* are coupled to the output of summing circuit 61. A pair of summing circuits 90, 91 couple to the ends of the rectifiers which are remote from the summing circuits 60, 61, with the summing circuit 90 also providing a phase inversion. A pair of resistors 95, 96 couple the output terminals of the summing circuits 90, 91 to a common terminal 93, to which the terminal 3 of an additional reference/sample single pole-double throw switch 98 is connected.

As illustrated, terminal 1 of this switch 98 is coupled via the integrator 84 and the amplifier 88 to the negative polarity input of a first comparator 100 and to the positive polarity input of a second comparator 102. Correspondingly, terminal 2 of the switch 98 is coupled via the integrator 86 and the amplifier 89 to the positive polarity input of the comparator 100 and to the negative polarity input of the comparator 102. With the polarities indicated, the output signal developed by summing circuit 90 is shown by waveform *f* of FIG. 2, while the summing circuit 91 provides an output signal of the form shown by waveform *g*. The difference between these two signal waveforms is developed at the junction 93, and is represented by the waveform h in this figure.

Figure 3:
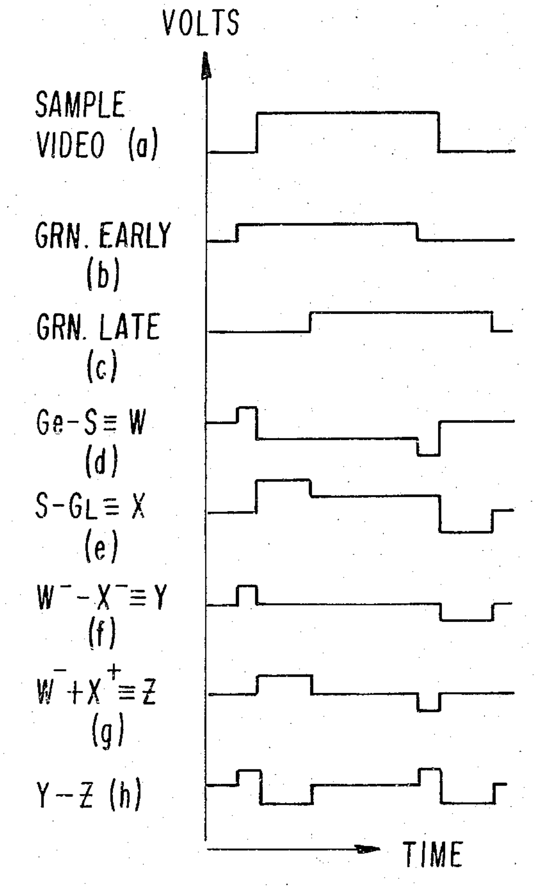

In general, with terminals 2 and 3 of switch 98 interconnected and with this difference being integrated by the unit 86 to provide either positive or negative direct voltage outputs, one of the comparators 100, 102 can be arranged to provide an output signal useful in varying the centering voltage for the pickup tube scanning beam in one direction, while the other comparator can be arranged to make centering voltage variations in an opposite manner. Where the waveforms of FIG. 2 illustrate the situation when correct registry between red and green component colors is present, a zero voltage signal should be developed by the integrator 86, so that no control signal should be developed by the comparators 100, 102. An out-of-balance situation is illustrated in FIG. 3, on the other hand, which shows that a control signal would be developed from the comparators in that instance to alter the centering voltage. For the case illustrated in FIG. 3, a signal would be developed at output terminal 104 of the comparator 102 to cause a binary counter to lessen its count in producing a less positive centering voltage. If the energy content of the positive-going excursions were to exceed the energy content of the negative-going excursions, instead, then comparator 100 would develop an output signal at its terminal 103, to increase the count and produce a more positive beam centering voltage.

Similar operations will be seen to follow where terminal 3 of switch 70 is adjusted to contact its blue signal input from terminal 44, instead of its red signal input from terminal 43. As previously mentioned, these operations can occur sequentially and automatically: first, horizontal component comparisons against the red color signal and then against the blue color signal, followed by vertical component comparisons against the red color and then against the blue color.

As indicated in the paragraphs immediately above, when the sampled-video, green-early and green-late signals are as illustrated in waveforms *a*, *b*, and *c* of FIG. 2, a zero voltage signal should be developed by the integrator 86. In that event, no control signal would be developed by the comparators 100, 102. However, because of tolerance variations among the various components, because of their aging characteristics, because of the different degrees of stability and the like, a possibility could still exist that even with the correct registry situation as evidenced by these three signal waveforms, a difference voltage could be developed, erroneously causing a correction signal to be provided from one or the other of the comparators 100, 102. The deflection apparatus for the television picture tube will respond to adjust for this "seeming" mis-registry, when in fact no such problem exists.

In order to remedy this situation, the control apparatus of the invention includes a reference or calibration loop to substitute for the red or blue video signal, a green signal in substantial time synchronism. The integrated potential obtained by comparing the reference green color signal against essentially itself in this manner, instead of against the red or blue color signal, thus provides an "error" voltage due solely to variations in the amplifying, clamping and timing circuits of the control system, for the reason that the green color signal cannot be mis-registered with itself.

To this end, the reference/sample switches 68 and 98 are periodically arranged to connect their terminals 1 to their terminals 3 when these calibrations are to be made. Although the input signal level to be compared against the reference is one-half the magnitude at terminal 41 from whence it is developed as it is at either of terminals 43 or 44, the amplitude of signal supplied to terminal 1 of switch 68 will be the same as the amplitude of signal applied to terminal 2 of this switch because of the appropriate choice in gains for the amplifiers 11, 13 and 14. As will be readily apparent, a zero voltage direct current level should be developed by the integrator 84 for the case where all components are operating similarly in the two comparison channels for this instance where green is being compared against itself. Any disparity between translation characteristics in one channel or the other will result in the development of either a positive or negative voltage from the integrator 84, causing an output signal to be developed from comparators 100 or 102, depending upon the polarity of this translation error.

By time sharing the red or blue sample with this green substitute to be compared, a "compensating" error voltage can be provided and held by the integrators 84, 86, to add to or subtract from the control signals obtained when the comparison is being made against the red or blue component colors. Taking in the vagaries of the translation characteristics in this manner can thus improve the overall accuracy of the detection system. This follows from the realization that any error voltage resulting from a comparison of one color component against itself is evidence of different translation characteristics in the comparison channels.

As noted, this substitution of the green color signal for the red or blue color signals to be compared can be established on a time sharing basis. More specifically, the comparison of horizontal components of the green substitute signal against the green reference signal can be calibrated to precede the comparisons of horizontal components of the red signal with the green reference signal, and then the blue signal with the green reference. Similarly, calibration of the vertical components can be had by comparing the vertical components of the green signal substitute with the green reference signal prior to any comparison of the red vertical components against the green reference signal, and then the blue vertical components against the green reference. In the embodiment of the invention illustrated in FIG. 1, four television fields were utilized in performing the registry comparisons, two fields for sample integration and two fields for referencing. The sequence selected is set forth in Table 1 below wherein the notation "H CAL" represents the calibration of the horizontal components of the green signal against itself, where "V CAL" represents the calibration of the vertical components of the green signal against itself, and wherein "H-R", "H-B", "V-R" and "V-B" represent comparisons of the horizontal components of the red, and then the blue color signal against the green color reference signal and comparisons of the vertical components of the red, and then the blue color signal against the green reference, respectively.

TABLE 1

1. H CAL
2. H-R
3. H CAL
4. H-R
5. H CAL
6. H-B
7. H CAL
8. H-B
9. V CAL
10. V-R
11. V CAL
12. V-R
13. V CAL
14. V-B
15. V CAL
16. V-B

Once these integrations are completed, the integrators 84, 86 may be cleared, ready to start the next channel of comparisons.

While there has been described what is considered to be a preferred embodiment of the present invention, it will be readily appreciated that modifications may be made by those skilled in the art without departing from the teachings herein of not only providing automatic comparisons of the horizontal and vertical components of red or blue color signals with a reference green color signal, but of additionally periodically making comparisons of the horizontal and vertical color components of the green signal against itself at different points in the comparison channels to provide control signal indications of tolerance or other instabilities which give rise to error voltages not normally present when correct registration of color components is present. In response to these error indications, compensating control signals are periodically applied to offset these vagaries of signal translations.

Although not shown as such, it will be understood that logic control signals can be timed to operate the switches 50–52, 68, 70 and 98 of FIG. 1 in order to make the time sharing comparisons of Table 1. It will similarly be understood from the waveforms of FIGS. 2 and 3 that correct registration occurs when the leading edges of the green-early and green-late signals differ in their timings with respect to the leading edge of the red or blue sample video by substantially equal amounts. As previously mentioned, these early and late signals derive from signals present in the video processing chain, although with different delay characteristics.

What is claimed is:

1. An automatic centering control system for the electron scanning beams of television apparatus comprising:

means for supplying signal information representative of television programming of a first color content;

means for supplying signal information representative of said same television programming, and of a second color content;

means responsive to said second color content signal information for providing third and fourth signal informations, advanced and delayed in time with respect to said signal information corresponding to said second color content signal;

means, including a switch, for processing said first, second, third and fourth signal informations to provide, for one position of said switch, a control signal indicative of timing differences between corresponding portions of said first and third signal informations and of said first and fourth signal informations, and for another position of said switch, a control signal indicative of timing differences between corresponding portions of said second and third signal informations and of said second and fourth signal informations; and utilization means coupled to said processing means for applying said control signal to the deflection circuits of said television apparatus to stabilize the position of said beams and the resulting registry of said apparatus.

2. The system of claim 1 wherein said signal information processing means provides control signals indicative of timing differences between corresponding horizontal component portions of said first and third signal informations and of said first and fourth signal informations.

3. The system of claim 1 wherein said signal information processing means provides control signals indicative of timing differences between corresponding vertical component portions of said first and third signal informations and of said first and fourth signal informations.

4. The system of claim 1 wherein said first and second supply means supply signal informations representative of different color signal contents.

5. The system of claim 4 wherein said first supply means supplies signal informations representative of red color signal contents and said second supply means supplies signal informations representative of green color signal contents.

6. The system of claim 4 wherein said first supply means supplies signal informations representative of blue color signal contents and said second supply means supplies signal informations representative of green color signal contents.

7. The system of claim 1 wherein said first and second supply means supply signal informations representative of the same color signal contents.

8. The system of claim 7 wherein said first and second supply means supply signal informations representative of green color signal contents.

9. The system of claim 1 wherein said processing means includes:

means for subtracting said first signal information content from said third signal information content to provide a fifth signal information content;

means for subtracting said fourth signal information content from said first signal information content to provide a sixth signal information content;

means for subtracting said sixth signal information content from said fifth signal information content to provide a seventh signal information content;

means for subtracting said fifth signal information content from said sixth signal information content to provide an eighth signal information content;

means for subtracting said eighth signal information content from said seventh signal information content to provide a ninth signal information content; and means responsive to said ninth signal information component to provide a control signal indicative of different energy contents between opposite polarity excursions in its signal energies.

10. The system of claim 9 wherein said last-mentioned means includes means for providing a control voltage of a first level when said opposite polarity energy contents are identical, and of second and third varying levels dependent upon the direction and degree of differences in the energy contents of said opposite polarity excursions.

* * * * *

UNITED STATES PATENT OFFICE
CERTIFICATE OF CORRECTION

Patent No. 3,830,959 Dated August 20, 1974

Inventor(s) ROBERT ADAMS DISCHERT and JOHN FRANCIS MONAHAN

It is certified that error appears in the above-identified patent and that said Letters Patent are hereby corrected as shown below:

FIGURE 1a: The line indicating a connection from the cathode of diode 81b to the anode of diode 82b should include a dot adjacent the anode of diode 82b.

Figure 1B:
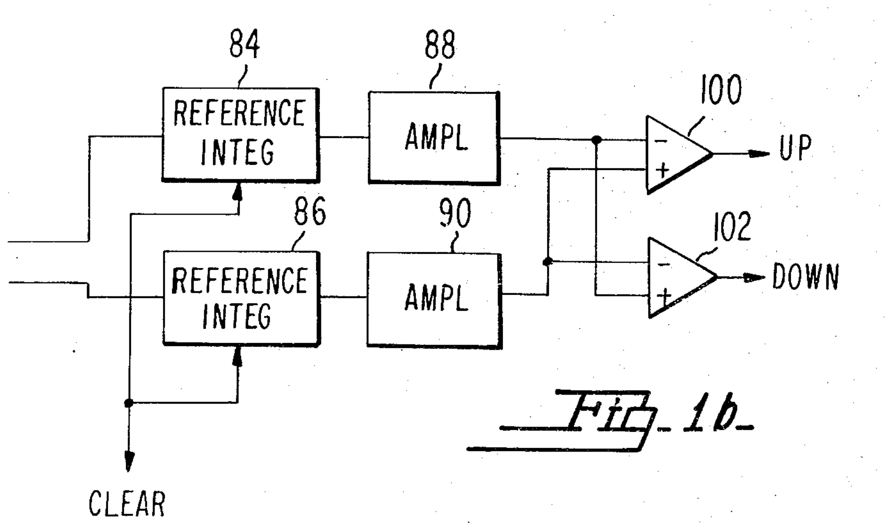

FIGURE 1b: Change the reference numeral "90" to -- 89 --.

Signed and sealed this 17th day of December 1974.

(SEAL)
Attest:

McCOY M. GIBSON JR.
Attesting Officer

C. MARSHALL DANN
Commissioner of Patents